(12) United States Patent
Chen et al.

(10) Patent No.: US 12,688,562 B2
(45) Date of Patent: Jul. 21, 2026

(54) DIGITAL HOLOGRAPHIC WRAPPED PHASE ABERRATION COMPENSATION METHOD BASED ON DEEP LEARNING

(71) Applicant: ZHEJIANG SCI-TECH UNIVERSITY, Zhejiang (CN)

(72) Inventors: Benyong Chen, Zhejiang (CN); Liu Huang, Zhejiang (CN); Jianjun Tang, Zhejiang (CN); Liping Yan, Zhejiang (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 201 days.

(21) Appl. No.: 18/645,399

(22) Filed: Apr. 25, 2024

(65) Prior Publication Data

US 2024/0273691 A1      Aug. 15, 2024

Related U.S. Application Data

(63) Continuation of application No. PCT/CN2023/074510, filed on Feb. 6, 2023.

(30) Foreign Application Priority Data

Oct. 26, 2022      (CN) .......................... 202211319611.3

(51) Int. Cl.
*G06T 5/80*        (2024.01)
*G03H 1/04*        (2006.01)
(Continued)

(52) U.S. Cl.
CPC ............. *G06T 5/80* (2024.01); *G03H 1/0443* (2013.01); *G06T 3/18* (2024.01); *G06T 5/20* (2013.01);
(Continued)

(58) Field of Classification Search
None
See application file for complete search history.

(56) References Cited

U.S. PATENT DOCUMENTS

2018/0292784 A1 * 10/2018 Nguyen ............... G02B 21/365

FOREIGN PATENT DOCUMENTS

| CN | 111461224 | 7/2020 |
| CN | 114001643 | 2/2022 |

(Continued)

OTHER PUBLICATIONS

Yuhao Niu et al., "Interferometric Wavefront Sensing System Based on Deep Learning", Applied Sciences, vol. 10, No. 23, Nov. 27, 2020, pp. 1-15.

(Continued)

*Primary Examiner* — Yanna Wu
(74) *Attorney, Agent, or Firm* — JCIPRNET

(57)        ABSTRACT

In a digital holographic wrapped phase aberration compensation method based on deep learning, a random Zernike polynomial coefficient and a corresponding wrapped phase map are generated by a computer and are respectively treated as a learning label and a network to train a neural network model. A digital holographic optical setup is built to record a hologram of a sample to be measured, the wrapped phase map is inputted into the trained neural network model after numerical reconstruction, and the Zernike polynomial coefficient is outputted to reconstruct a phase aberration distribution and to compensate complex amplitude in a spatial domain. Phase filtering and unwrapping are performed on the compensated wrapped phase map, and Zernike polynomial fitting based on background segmentation is performed on the unwrapped phase to compensate for residual aberration.

7 Claims, 3 Drawing Sheets

(51) Int. Cl.
  G06T 3/18 (2024.01)
  G06T 5/20 (2006.01)
  G06T 7/136 (2017.01)

(52) U.S. Cl.
  CPC ......... G06T 7/136 (2017.01); *G03H 2226/02*
    (2013.01); *G06T 2207/20081* (2013.01); *G06T*
      *2207/20084* (2013.01); *G06T 2207/20192*
        (2013.01)

(56) References Cited

FOREIGN PATENT DOCUMENTS

| | | |
|---|---|---|
| CN | 114511763 | 5/2022 |
| CN | 115760598 | 3/2023 |

OTHER PUBLICATIONS

Liu, Yuan-Chao et al., "Study on Class Imbalance Based on Optical Wrapping Phase", Optics & Optoelectronic Technology, vol. 19, No. 4, Aug. 31, 2021, with English abstract thereof, pp. 37-44.
"International Search Report (Form PCT/ISA/210) of PCT/CN2023/074510," mailed on Jun. 8, 2023, pp. 1-5.
"Written Opinion of the International Searching Authority (Form PCT/ISA/237) of PCT/CN2023/074510," mailed on Jun. 8, 2023, pp. 1-5.

* cited by examiner

DIGITAL HOLOGRAPHIC WRAPPED PHASE ABERRATION COMPENSATION METHOD BASED ON DEEP LEARNING

CROSS-REFERENCE TO RELATED APPLICATION

This application is a continuation of international application of PCT application serial no. PCT/CN2023/074510, filed on Feb. 6, 2023, which claims the priority benefit of China application no. 202211319611.3, filed on Oct. 26, 2022. The entirety of each of the above mentioned patent applications is hereby incorporated by reference herein and made a part of this specification.

BACKGROUND

Technical Field

The disclosure relates to a digital hologram processing method in the field of digital holography technology, and in particular, relates to a digital holographic wrapped phase aberration compensation method based on deep learning.

Description of Related Art

When microstructural surface topography is measured using digital holography technology, the off-axis optical path structure, the spherical curvature mismatch between the object beam and the reference beam, and the optical aberration introduced by the system construction, etc. cause the phase information after holographic reconstruction to contain not only the phase of the sample to be measured, but also a large amount of tilt, quadratic, and high-order phase aberration. Not until these phase aberrations are accurately compensated will the three-dimensional profile of the sample to be measured be effectively restored. In the wrapped phase map obtained by the arctangent transformation, these phase aberrations appear as dense oblique curved fringes modulated by the phase of the sample to be measured. As the phase aberration introduced by the system increases, the wrapped phase fringes become denser.

When the structural edge of the sample to be measured is located on a dense fringe region, fringe dislocations may easily occur. Both fringe dislocations and coherent noise introduced by coherent light sources reduce the data reliability of wrapped phase map produce errors in the phase unwrapping process. In the conventional phase aberration numerical compensation methods, continuous phase compensation is performed after phase unwrapping. Inaccurate phase unwrapping directly restricts the effectiveness of phase aberration compensation.

The wrapped phase map be denoised and smoothed before phase unwrapping. However, for the dense fringe-wrapped phase map, inappropriate phase filtering may cause fringe damage, aggravate fringe misalignment or over-smooth the edge of the sample structure, and introduce new phase errors.

SUMMARY

To solve the above technical problems, the disclosure provides a digital holographic wrapped phase aberration compensation method based on deep learning, in which a network model of wrapped phase map input and Zernike polynomial coefficients output is directly established, and most of aberration components in the wrapped phase map are automatically compensated before phase unwrapping, so that advantages such as fast calculation speed, high accuracy, and robustness are provided without any manual intervention, input of initial parameters, and limitation of sample types.

The disclosure includes the following technical solutions.

The method includes two stages including a network training stage and a holographic measurement stage, and the method is divided into the following steps:

a. the step in the network training stage is:

automatically generating, by a computer, simulated wrapped phase map data to train a neural network model, and obtaining a trained neural network model.

b. in the holographic measurement stage, processing, by the trained neural network model, a sample to be measured, and obtaining a three-dimensional profile distribution of the sample to be measured.

The network training stage specifically includes the following.

In step one, the computer generates a large number of random Zernike polynomial coefficients A according to a predetermined numerical range, the Zernike polynomial coefficients A are used to fit several continuous two-dimensional surfaces as phase aberrations through Zernike polynomials to simulate the phase aberrations, and the phase aberrations are superimposed on the same type of predetermined microstructure phase as the sample to be measured to construct a microstructure phase aberration distribution $\varphi$, wherein a two-dimensional curved surface serves as a phase aberration, and a microstructure phase aberration distribution $\varphi$ is obtained after a phase aberration is superposed, and different two-dimensional curved surfaces correspond to different microstructure phase aberration distributions $\varphi$.

The predetermined microstructure phase is also obtained by computer simulation.

In step two, the microstructure phase aberration distribution $\varphi$ is converted into a complex exponent, and a phase angle of the complex exponent is calculated to obtain a simulated wrapped phase map $\phi$ with a value in a range of $[-\pi, \pi]$.

In step three, the neural network model is established, the neural network model is trained by treating the simulated wrapped phase map $\phi$ as an input of the neural network model and treating the corresponding Zernike polynomial coefficient A as a label of the neural network model, and the trained neural network model is obtained.

The steps of the holographic measurement stage includes the following.

In S1, a digital holographic optical setup is built to measure the sample and record a hologram of the sample to be measured, numerical reconstruction is performed based on the hologram to obtain complex amplitude U of the sample to be measured, a wrapped phase map of the complex amplitude U is calculated and inputted into the trained neural network model, and a Zernike polynomial coefficient $A_c$ is outputted.

In S2, phase aberration $\varphi_{ac}$ is fitted by using the Zernike polynomial coefficient $A_c$, and a conjugate complex exponent $\exp(-j\varphi_a)$ of the fitted phase aberration $\varphi_{ac}$ is multiplied by the complex amplitude U compensate for most of the phase aberration in the complex amplitude U and to obtain a pre-compensated wrapped phase map with most of the phase aberration being compensated.

In S3, phase filtering and phase unwrapping are performed on the pre-compensated wrapped phase map to obtain a continuous phase distribution $\varphi_c$ containing only a small part of residua phase aberration, and edge enhancement and local adaptive threshold segmentation are performed on the continuous phase distribution $\varphi_c$ to obtain a binary mask that only represents a background region.

In S4, phase data of the background region in continuous phase distribution $\varphi_c$ is extracted by using the binary mask, a Zernike polynomial equation set is constructed based on the phase data of the background region, a Zernike polynomial coefficient $A_r$ of residual aberration is solved, and Zernike polynomial fitting is performed by using the Zernike polynomial coefficient $A_r$ of the residual aberration to obtain a residual aberration phase distribution or.

In S5, the phase distribution $\varphi_r$ is subtracted from the continuous phase distribution $\varphi_c$ to recover and obtain a true phase of the sample to be measured, and wavelength conversion and outputting are performed on the true phase to obtain the three-dimensional profile distribution of the sample to be measured.

In the above processing of the disclosure, the wrapped phase aberration compensation based on deep learning is particularly performed before phase unwrapping. In this way, most of the phase aberration and fringe patterns modulated on the sample structure can be eliminated, and phase abnormality problems such as fringe damage and misalignment during the phase filtering process can be avoided. As such, coherent noise is suppressed while the edge information of the sample structure is protected, so that the quality of phase data is significantly improved, and automatic and accurate compensation of digital holographic phase aberration is achieved.

It is of great significance to directly perform aberration compensation on the wrapped phase map before phase unwrapping.

In the first step, the phase aberration constructed by the Zernike polynomial coefficients randomly-generated by the computer are superimposed on various microstructure phase models and the overall phase is truncated within the range of $[-\pi, \pi]$, so as to simulate the actual digital holographic wrapped phase map and to form the training samples for being inputted to the neural network model. When training the network, there is no need to input actual digital holographic wrapped phase map and Zernike polynomial coefficients.

The neural network model in the disclosure is any neural network model with a residual structure for classification or a variant thereof. The network only needs to be trained once, and then the trained network can be used to perform unlimited regression analyzes on unknown samples.

The neural network model is resnet50, which can be implemented with frameworks such as Tensorflow or Pytorch.

In the S1, the digital holographic optical setup is any holographic optical setup such as coaxial structure, an off-axis structure, a microscopic imaging structure, a multi-wavelength structure, or a super-resolution structure and includes tilt aberration introduced by off-axis interference, secondary phase aberration introduced by a microscope objective lens, or high-order phase aberration introduced by optical path construction.

The sample to be measured is any microstructure used for holographic imaging and is a transmission type sample or a reflection type sample. The transmission sample is, for example, biological cells, a biological tissue structure, a microlens array, and the transmission type sample is, for example, a MEMS (Microelectromechanical Systems) micro-nano structure, an integrated circuit chip, a silicon wafer.

In the S1, the numerical reconstruction includes a first step and a second step performed in sequence, wherein the first step is a phase shifting step or a spatial filtering step, and the second step is a Fresnel diffraction method, a convolution method, an angular spectrum method, or a compressed sensing reconstruction step.

In the S3, the edge enhancement is achieved by superimposing gradients of continuous phases and a gradient binarization result, and the local adaptive threshold segmentation is to separately calculate a threshold of each pixel in the continuous phases and perform binarization processing.

Random Zernike polynomial coefficients and the corresponding wrapped phase maps are generated by a computer and are respectively treated as the learning labels and the network input to create a data set for neural network model training in the disclosure. A digital holographic optical setup is built to record the sample hologram, the wrapped phase map is inputted into the trained network after numerical reconstruction, and the Zernike polynomial coefficients are outputted to reconstruct the phase aberration distribution and to compensate the complex amplitude in the spatial domain. Phase filtering and unwrapping are performed on the pre-compensated wrapped phase map, and Zernike polynomial fitting based on background segmentation is performed on the unwrapped phase to compensate for residual aberration.

A network model with the wrapped phase map as input and the Zernike polynomial coefficients as output is directly established in advance, and most of the aberration components in the wrapped phase map are automatically compensated before phase unwrapping, so that the problem of difficulty in compensating the phase aberration component in the wrapped phase map before phase unwrapping is solved in the disclosure.

The technical solutions provided by the disclosure at least achieves the following beneficial technical effects.

(1) Reliable Phase Data

The mapping relationship between the wrapped phase map and the Zernike polynomial coefficients is directly established by training the neural network, and the aberration is pre-compensated before the phase is unwrapped in the disclosure. The density of wrapped phase fringes is reduced, and problems such as fringe damage, misalignment, and excessive smoothing of sample structure edges during phase filtering are prevented from occurring, so that the reliability of wrapped phase data is effectively improved.

(2) Simple Data Set Production

Compared to other methods that use deep learning to compensate for phase aberration, in the disclosure, a computer is only used to generate a large number of random Zernike polynomial coefficients and corresponding wrapped phase maps to create a data set for training the neural network. During network training, there is no need to build a digital holographic optical setup to record the actual microstructure hologram, numerically reconstruct the wrapped phase map, or go through a complex process of solving Zernike polynomial coefficients (including phase filtering, phase unwrapping, background segmentation, and Zernike polynomial fitting) to create a data set, so that the difficulty of making a network training data set is simplified.

(3) Ultra-fast Compensation Speed

Compared to the conventional phase aberration compensation methods, in the disclosure, there is no need for any manual intervention, input of initial parameters, and limitation of sample types, so the efficiency of phase aberration compensation calculations is improved. The disclosure not only can be used in conventional digital holographic systems, but can also be widely used in multi-wavelength digital holographic systems, synthetic aperture super-resolution holographic systems, and large field of view stitching digital holographic microscopy systems to simultaneously process multiple aberration compensation tasks.

In summary, the method of the disclosure only uses the simulation data set to train the network and compensates most of the aberration before phase unwrapping. In this way, the reliability of the wrapped phase data is improved, the accuracy of phase recovery is significantly improved, and advantages such as fast calculation speed and accurate aberration compensation are provided.

DESCRIPTION OF THE EMBODIMENTS

The disclosure is going to be further described in the following paragraphs together with the embodiments and drawings.

Figure 1:
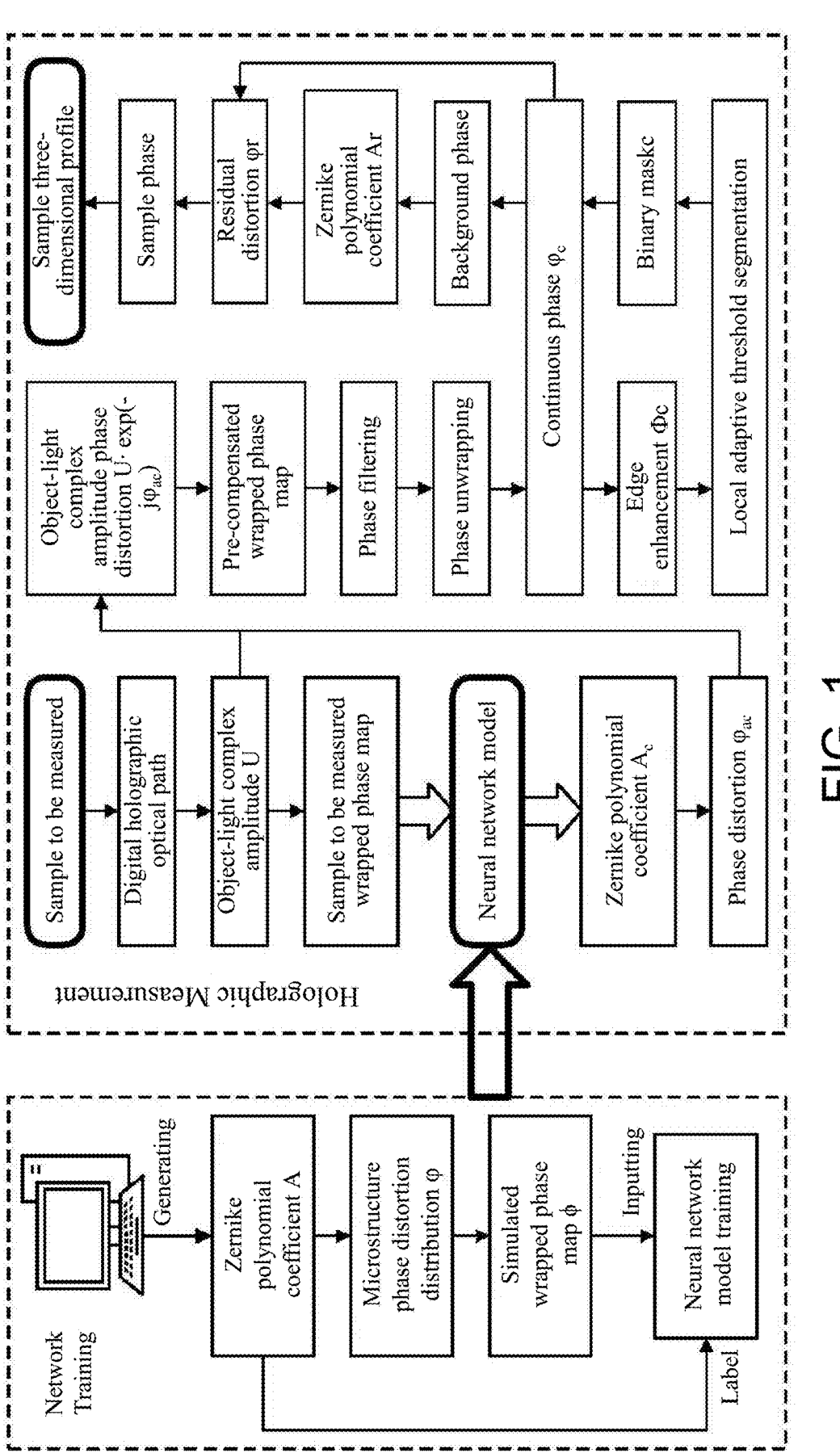
FIG. 1 is a flow chart of a digital holographic wrapped phase aberration compensation method based on deep learning according to an embodiment of the disclosure.

The embodiments of the disclosure are shown in the flow chart of FIG. 1, and the specific steps are as follows.

(1) Network Training Stage

According to size of input data of a neural network (residual network ResNet with 20 convolutional layers), a length and a width of a two-dimensional plane are set on the X-axis and Y-axis respectively, the values are within the range of [−1, 1], and the number of sampling points is M×M. A set of randomly generated real numbers are used as Zernike polynomial coefficients $A=[a_0\ a_1\ a_2 \ldots a_n]^T$, $a_0\ a_1\ a_2 \ldots a_n$ represent the Zernike polynomial coefficients of the first n terms, and T represents matrix transpose.

A continuous two-dimensional surface is obtained through Zernike polynomial fitting to represent phase aberration. The phase aberration is superimposed with a simulated microstructure phase to simulate a microstructure phase aberration distribution $\phi$.

A simulated wrapped phase map $\phi$ is thus obtained and is specifically expressed as:

$$\phi(x, y) = \text{angle } \{\exp[i\varphi(x, y)]\},$$

where (x, y) is a coordinate point on the two-dimensional plane, $1 \leq x \leq M$, $1 \leq y \leq M$, $i = \sqrt{-1}$ represents an imaginary number, and angle represents an operation of obtaining a complex phase angle. $\phi(x, y)$ represents a wrapped phase with coordinates (x, y) on the wrapped phase map.

Figure 2:
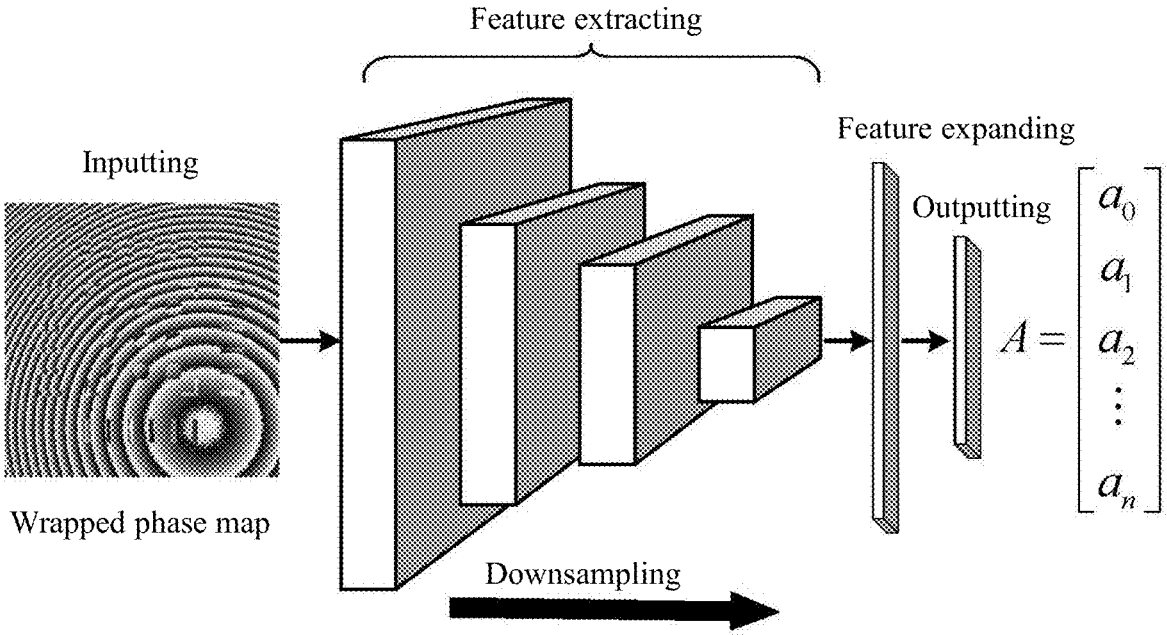
FIG. 2 is a structural diagram of a neural network (ResNet) according to an embodiment of the disclosure.

A training set with a large number of simulated wrapped phase maps $\phi$ and corresponding Zernike polynomial coefficients A as network inputs and labels is calculated and generated to train a ResNet convolutional neural network as shown in FIG. 2. Herein, initial parameters of the network are set to a learning rate of 0.0003, an optimizer is Adam, a loss function is a root mean square error function, and a learning rate decay function is a cosine annealing function. As the amount of data in the training set increases, the network may be less likely to overfit easily.

(2) Holographic Measurement Stage

A digital holographic coaxial optical path is built, and a positive first-order term OR* in a hologram of a sample to be measured is extracted through a phase shift method. Alternatively, a digital holographic off-axis optical path is built, and a positive first-order term OR* in the hologram is extracted through a spatial filtering algorithm. Next, a holographic reconstruction algorithm such as a Fresnel diffraction method, a convolution method, an angular spectrum method, or compressed sensing is adopted to reconstruct the complex amplitude U of the sample to be measured. A sample to be measured wrapped phase map angle(U) is inputted into the trained neural network model, and a set of Zernike polynomial coefficients $A_c$ is automatically outputted to approximately represent the phase aberration.

Next, a phase aberration $\varphi_{ac}$ is fitted using the Zernike polynomial coefficient $A_c$. A conjugate complex exponent $\exp(-j\varphi_a)$ thereof is multiplied by the complex amplitude U of the sample to be measured to eliminate most of the phase aberration components in the complex amplitude. A pre-compensated wrapped phase map is calculated, that is, $\text{angle}[U \cdot \exp(-j\varphi_{ac})]$.

Figures 3A, 3B, 3C, 3D, 3E, 3F:
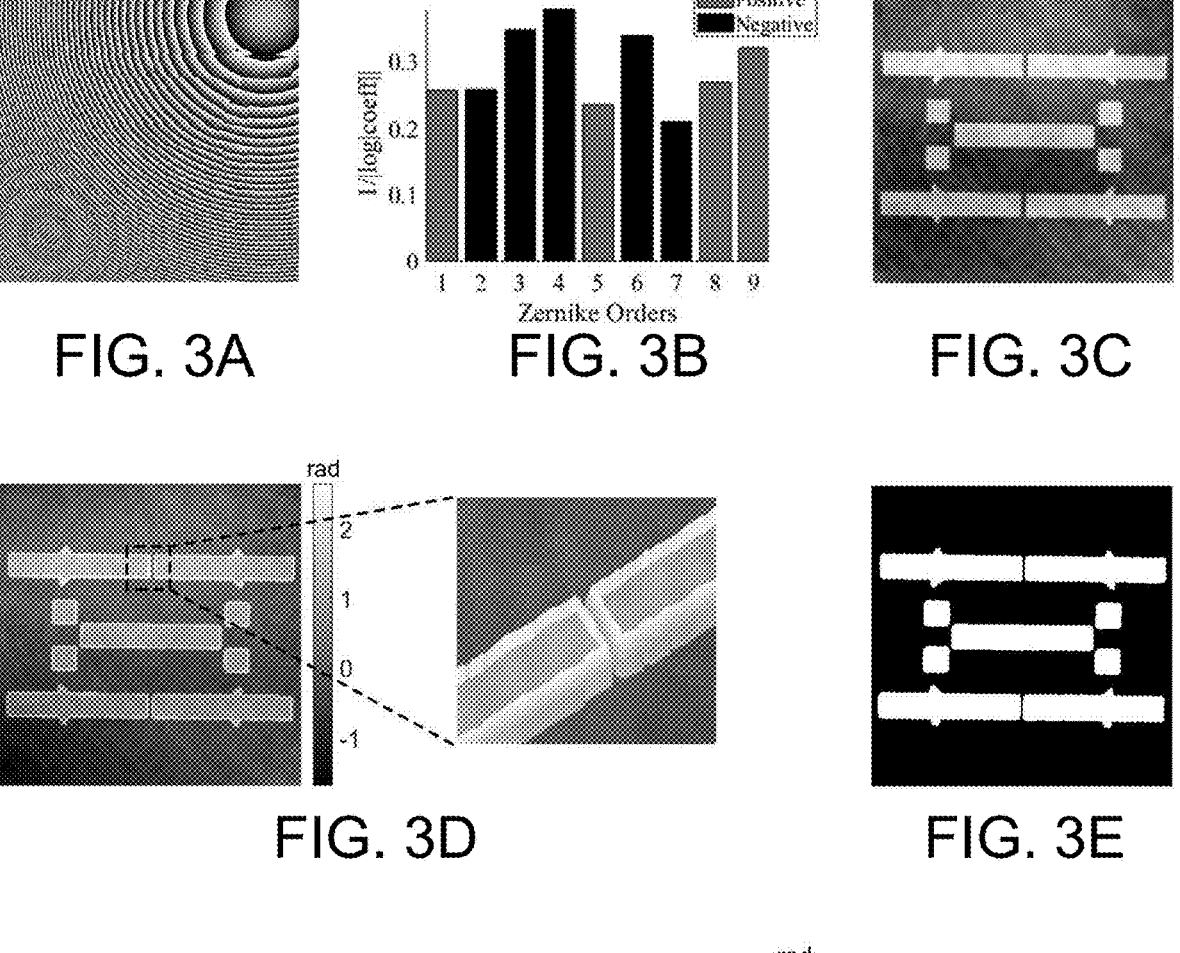
FIGS. 3A to 3F are diagrams of experimental results of specific examples according to an embodiment of the disclosure.

FIG. 3A is a microstructure wrapped phase map obtained from actual holographic measurement. FIG. 3B is a graph of 9-term Zernike polynomial coefficients outputted by a neural network. FIG. 3C is a wrapped phase map after pre-compensation by the neural network.

The pre-compensated wrapped phase map then is subjected to phase filtering based on sine and cosine transform and phase unwrapping based on least squares iteration, and a continuous phase distribution $\varphi_c$ containing only a small amount of residual aberration is obtained. Gradient of the continuous phase distribution $\varphi_c$ is calculated, and the gradient is binarized and added to $\varphi_c$ to obtain the continuous phase distribution $\varphi_c$ with an enhanced edge feature. An adaptive threshold of each pixel in $\Phi_c$ is calculated, and local adaptive threshold segmentation is performed on $\Phi_c$ e to obtain a binary mask that only represents a background region.

FIG. 3D is a continuous phase map after edge enhancement. FIG. 3E is a binary mask obtained after local adaptive threshold segmentation is performed on FIG. 3D, in which black pixels represent the background region.

Finally, phase data of the background region in the continuous phase distribution $\varphi_c$ is extracted by using the binary mask. Only the background phase is fitted with a Zernike polynomial to obtain the Zernike polynomial coefficient $A_r$ and the phase distribution $\varphi_r$ of the residual aberration. Subtracting $\varphi_r$ from $\varphi_c$ recovers a true phase of the sample to be measured, and finally a three-dimensional profile distribution of the sample is outputted.

FIG. 3F shows the recovered true phase distribution of the sample to be measured. It can be seen that the sample phase obtained by the disclosure may accurately characterize the surface topography distribution of the microstructure, the background region is flat, and the microstructure profile is clear, so that the effectiveness of the disclosure is confirmed.

Through the above implementation, to address the problems found in the related art that the continuous phase aberration compensation method after unwrapping is limited by the coherent noise level and phase data reliability, in the disclosure, the aberration compensation is placed before the wrapped phase. Combined with the deep learning method in artificial intelligence, most of the aberration in the wrapped phase map may be compensated without first unwrapping. The density of wrapped phase fringes is reduced, problems such as fringe damage, misalignment, and excessive smoothing during the phase filtering process are prevented from occurring, and the reliability of phase data and the accuracy of holographic measurement are improved.

What is claimed is:

1. A digital holographic wrapped phase aberration compensation method based on deep learning, applied to a digital holographic optical measurement system characterized in that, the method comprises two stages comprising a network training stage and a holographic measurement stage, and the method is divided into the following steps:

a. in the network training stage, comprising:

automatically generating, by a computer, simulated wrapped phase map data, wherein the simulated wrapped phase map data are obtained by constructing a microstructure phase aberration distribution using Zernike polynomials and converting the microstructure phase aberration distribution into a wrapped phase; and inputting, by the computer, the simulated wrapped phase map data into a neural network model for training to obtain a trained neural network model, wherein the neural network model is a deep residual network adopting a ResNet50 architecture and is configured to process wrapped phase data with a value in a range of $[-\pi, \pi]$; and b. in the holographic measurement stage, comprising:

building a digital holographic optical apparatus to measure a microstructure sample used for holographic imaging, wherein the microstructure sample is a transmission type sample or a reflection-type sample; and processing, by the trained neural network model, an aberration compensation processing on wrapped phase data of the microstructure sample, and obtaining a three-dimensional profile distribution of the microstructure sample, wherein the aberration compensation processing comprises a pre-compensated step performed before phase unwrapping and a residual compensation step performed after phase unwrapping.

2. The digital holographic wrapped phase aberration compensation method based on deep learning according to claim 1, wherein the step for generating the simulated wrapped phase map data in the network training stage comprises:

step one: generating, by the computer, a large number of random Zernike polynomial coefficients A, fitting, by using the Zernike polynomial coefficients A, several continuous two-dimensional surfaces as phase aberrations through Zernike polynomials, and superimposing the phase aberrations on a same type of microstructure phase as the sample to be measured to construct a microstructure phase aberration distribution $\varphi$;

step two: converting the microstructure phase aberration distribution $\varphi$ into a complex exponent and calculating a phase angle of the complex exponent to obtain a simulated wrapped phase map $\phi$ with the value in the range of $[-\pi, \pi]$;

step three: establishing the neural network model adopting the ResNet50 architecture, training the neural network model by treating the simulated wrapped phase map $\phi$ as an input of the neural network model and treating the corresponding Zernike polynomial coefficient A as a label of the neural network model, and obtaining the trained neural network model.

3. The digital holographic wrapped phase aberration compensation method based on deep learning according to claim 1, wherein the holographic measurement stage comprises following steps:

S1: building the digital holographic optical apparatus to measure the microstructure sample and record a hologram of the microstructure sample, performing numerical reconstruction based on the hologram to obtain a complex amplitude U of the microstructure sample, calculating a wrapped phase map of the complex amplitude U and inputting the wrapped phase map into the trained neural network model, and outputting a Zernike polynomial coefficient $A_c$ by the neural network model;

S2: before phase unwrapping, fitting, by using the Zernike polynomial coefficient $A_c$, phase aberration $\varphi_{ac}$ and multiplying a conjugate complex exponent $\exp(-j\varphi_a)$ of the phase aberration $\varphi_{ac}$ by the complex amplitude U to obtain a pre-compensated wrapped phase map with most of the phase aberration being compensated;

S3: performing phase filtering and phase unwrapping on the pre-compensated wrapped phase map to obtain a continuous phase distribution $\varphi_c$ containing only a small part of phase aberration, and performing edge enhancement and local adaptive threshold segmentation on the continuous phase distribution $\varphi_c$ to obtain a binary mask that only represents a background region;

S4: extracting, by using the binary mask, phase data of the background region in continuous phase distribution Pc, constructing a Zernike polynomial equation set based on the phase data of the background region, solving a Zernike polynomial coefficient $A_r$ of residual aberration, and performing, by using the Zernike polynomial coefficient $A_r$, Zernike polynomial fitting to obtain a residual aberration phase distribution $\varphi_r$; and S5: subtracting the phase distribution $\varphi_r$ from the continuous phase distribution $\varphi_c$ to recover and obtain a true phase of the microstructure sample, and performing wavelength conversion on the true phase to output and obtaining the three-dimensional profile distribution of the sample to be measured.

4. The digital holographic wrapped phase aberration compensation method based on deep learning according to claim 3, wherein in the S1, the digital holographic optical setup is one of a coaxial structure, an off-axis structure, a microscopic imaging structure, a multi-wavelength structure and a super-resolution structure.

5. The digital holographic wrapped phase aberration compensation method based on deep learning according to claim 3, wherein in the S1, the numerical reconstruction comprises a first step and a second step performed in sequence, wherein the first step is a phase shifting step or a spatial filtering step, and the second step is a Fresnel diffraction method, a convolution method, an angular spectrum method or a compressed sensing reconstruction step.

6. The digital holographic wrapped phase aberration compensation method based on deep learning according to claim 3, wherein in the S3, the edge enhancement is achieved by superimposing gradients of continuous phases and a gradient binarization result, and the local adaptive threshold segmentation is to separately calculate a threshold of each pixel in the continuous phases and perform binarization processing.

7. The digital holographic wrapped phase aberration compensation method based on deep learning according to claim 1, wherein the microstructure sample used for holographic imaging is a microstructure suitable for digital holographic imaging, comprising a Microelectromechanical Systems micro-nano structure, and an integrated circuit chip.

\* \* \* \* \*